(12) United States Patent
Hofmann

(10) Patent No.: US 7,972,506 B2
(45) Date of Patent: Jul. 5, 2011

(54) CHROMATOGRAPHY COLUMNS AND THEIR OPERATION

(75) Inventor: Martin John Hofmann, Stroud (GB)

(73) Assignee: Pall Corporation, Port Washington, NY (US)

( * ) Notice: Subject to any disclaimer, the term of this patent is extended or adjusted under 35 U.S.C. 154(b) by 1199 days.

(21) Appl. No.: 11/570,789

(22) PCT Filed: Jul. 8, 2005

(86) PCT No.: PCT/EP2005/007413
§ 371 (c)(1),
(2), (4) Date: Dec. 18, 2006

(87) PCT Pub. No.: WO2006/005540
PCT Pub. Date: Jan. 19, 2006

(65) Prior Publication Data
US 2008/0272042 A1    Nov. 6, 2008

(30) Foreign Application Priority Data
Jul. 8, 2004 (GB) .................................. 0415394.6

(51) Int. Cl.
*B01D 15/08* (2006.01)
(52) U.S. Cl. ..................................... 210/198.2; 210/656
(58) Field of Classification Search .................. 210/635, 210/656, 659, 198.2, 232, 236; 95/82; 96/101
See application file for complete search history.

(56) References Cited

U.S. PATENT DOCUMENTS

| 3,487,938 | A | * | 1/1970 | Patterson | 210/198.2 |
| 4,350,595 | A | * | 9/1982 | Gunkel | 210/656 |
| 4,582,608 | A | * | 4/1986 | Ritacco | 210/656 |
| 4,737,292 | A | * | 4/1988 | Ritacco et al. | 210/656 |
| 4,865,728 | A | * | 9/1989 | Larsson | 210/198.2 |
| 4,891,133 | A | * | 1/1990 | Colvin, Jr. | 210/198.2 |
| 5,021,162 | A | * | 6/1991 | Sakamoto et al. | 210/635 |
| 5,141,635 | A | * | 8/1992 | LePlang et al. | 210/198.2 |
| 5,167,809 | A | * | 12/1992 | Mann et al. | 210/198.2 |
| 5,188,730 | A | * | 2/1993 | Kronwald | 210/198.2 |
| 5,324,426 | A | * | 6/1994 | Joseph et al. | 210/198.2 |

(Continued)

FOREIGN PATENT DOCUMENTS

EP    1 348 958    10/2003

(Continued)

OTHER PUBLICATIONS

International Preliminary Report on Patentability for PCT/EP2005/007413 (Chapter I of the Patent Cooperation Treaty) mailed Jan. 18, 2007.

(Continued)

*Primary Examiner* — Ernest G Therkorn
(74) *Attorney, Agent, or Firm* — Leydig, Voit & Mayer, Ltd.

(57) ABSTRACT

A chromatography column (100) is disclosed comprising a housing (10) comprising a tubular side wall (1); opposed, axially spaced end units (2,3) which together with the side wall define an enclosed bed space to contain a bed of particulate medium, at least one of the end units being slidable in axial direction; an axial drive element (5) connected to the slidable end unit, said drive element extending internally in the column bed space; a drive (4) positioned on or beyond the opposite end unit and connected to the drive element.

24 Claims, 8 Drawing Sheets

U.S. PATENT DOCUMENTS

| | | | |
|---|---|---|---|
| 5,378,361 A * | 1/1995 | Baeckstrum | 210/198.2 |
| 5,462,659 A * | 10/1995 | Saxena et al. | 210/198.2 |
| 5,486,289 A * | 1/1996 | McCullough | 210/289 |
| 5,667,675 A * | 9/1997 | Hatch et al. | 210/198.2 |
| 5,671,928 A * | 9/1997 | Lanyi et al. | 277/461 |
| 5,708,191 A | 1/1998 | Greenwood et al. | |
| 5,886,250 A | 3/1999 | Greenwood et al. | |
| 5,902,485 A * | 5/1999 | Davis et al. | 210/656 |
| 6,001,260 A * | 12/1999 | Hatch et al. | 210/656 |
| 6,082,180 A | 7/2000 | Greenwood | |
| 6,082,181 A | 7/2000 | Greenwood | |
| 6,117,317 A | 9/2000 | Dickson et al. | |
| 6,139,732 A * | 10/2000 | Pelletier | 210/198.2 |
| 6,444,122 B1 * | 9/2002 | Van Davelaar | 210/198.2 |
| 6,736,974 B1 | 5/2004 | Mann | |
| 6,763,698 B2 | 7/2004 | Greenwood | |
| 6,843,918 B2 * | 1/2005 | Hauck et al. | 210/656 |
| 6,877,375 B2 | 4/2005 | Greenwood | |
| 7,132,053 B2 * | 11/2006 | Hauck et al. | 210/656 |
| 7,267,765 B2 * | 9/2007 | Hauck et al. | 210/198.2 |
| 2003/0102266 A1 * | 6/2003 | Ritacco | 210/656 |
| 2004/0164012 A1 * | 8/2004 | Dunkley et al. | 210/198.2 |
| 2007/0193933 A1 * | 8/2007 | Vidalinc | 210/198.2 |

FOREIGN PATENT DOCUMENTS

| | | |
|---|---|---|
| GB | 2 258 415 | 2/1993 |
| WO | WO 96/10451 * | 4/1996 |

OTHER PUBLICATIONS

Greenwood, M. S., et al., *Journal of Fluids Engineering*, 126(2):189-192 (2004).

* cited by examiner

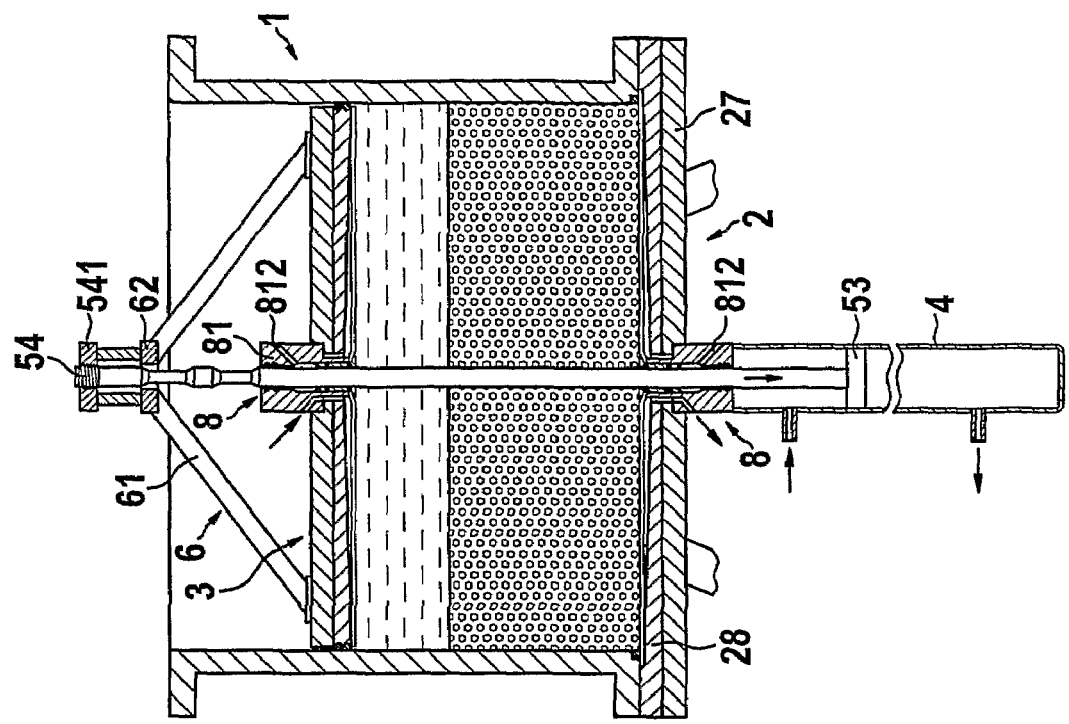
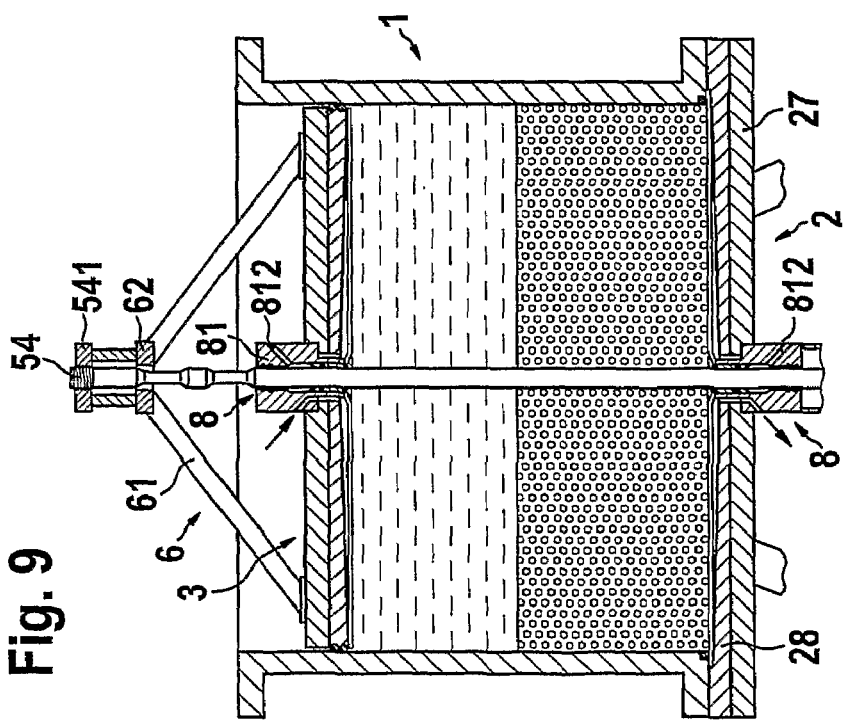

CHROMATOGRAPHY COLUMNS AND THEIR OPERATION

REFERENCE TO RELATED APPLICATIONS

This application is a 371 of PCT/US05/07413 filed Jul. 8, 2005.

BACKGROUND OF THE INVENTION

This invention relates to chromatography columns and methods of operating them. In particular, it relates to structures and methods useful in moving column end units, such as in packing and/or in unpacking a particulate medium which in use occupies a bed space of the column. The invention relates to any size column, and particularly relates to larger columns of the kind useful in industrial preparative chromatography, whose internal diameters might typically be from 200 mm upwards, perhaps up to 3000 mm.

A conventional industrial-scale chromatography column consists of a column housing having a tubular side wall—almost always cylindrical—and opposed axially spaced end units (commonly referred to as plates, or end plates), which together with the side wall define an enclosed bed space to contain a bed of particulate medium in use. For most processes the particulate medium is closely packed to form a packed bed which does not move as the liquid containing components to be separated (the mobile phase) is passed through the column. However some columns/processes use a more loosely dispersed or fluidised/expanded particle bed for the chromatographic process.

The column end units have conduits for the passage of mobile phase liquid, combined with a permeable structure or element that retains the appropriate particulate medium in the bed space. Typically, the permeable structure or element is a permeable layer (e.g., a mesh or sinter) extending across the end of the column, that is permeable to liquid but not to the particulate medium. Packed bed columns usually have such a permeable layer at both ends of the column.

Typically, columns are axially vertical, i.e., with top and bottom end units, and the following assumes this for convenience of description.

Conventionally, at least one of the end units is axially slidable in sealing relationship with the tubular side wall, e.g., so that the bed space volume can be adjusted. Often the top end unit has a slidable plate and the bottom end unit has a fixed end plate. When forming packed columns, after filling the bed space with sufficient slurry to form a packed bed of the required depth, the slidable plate (sometimes referred to as a piston or end unit piston as explained below) is moved towards the fixed end plate until the bed is firmly captured between the two permeable end structures.

Recently, chromatography columns with end units including a slurry valve have become popular. In these columns it is not necessary to take off the top end unit to pour in slurry. The slurry can be pumped in directly through the valve, initially expelling all the air from the bed space (referred to as "priming" the column) and then accumulating medium until there is sufficient medium for the bed. The valve is then shut, and the top end unit lowered to compress the bed if necessary. If desired, liquid can next be flowed down through the bed, referred to as "flow packing," and a clear supernatant is formed above the packed bed. This down flow can be maintained by closing the top valve as the top piston is forced down, so that the piston supplants the liquid pump. Chromatography then proceeds without needing to open the column. In some versions the spent bed can be disposed of after chromatography also through a valve in an end unit, by opening the valve and pumping in a carrier liquid to remove the bed gradually as a slurry through the open valve. Examples of these slurry valves are seen in WO 96/10451, GB 2258415 and U.S. Pat. No. 6,117,317, using various arrangements of controlled flow ports or conduits for slurry control and various mechanical movements in the valve to open and close the ports or conduits. Embodiments of the present invention are particularly useful with columns having a valve-controlled slurry flow port or conduit in one or both of the end units.

Controlling the sliding movement of a movable end plate is technically problematic, especially with large columns. The usual end unit has (or is) a large-diameter piston sealing outwardly against the tubular side wall, and must be kept accurately in a radial plane as it moves, especially when it is slid axially onto the bed in a packing process. To maintain stable perpendicularity to the axis, a conventional construction has a number of vertically-adjustable peripheral support pillars extending up around the column housing from the mounting in the bottom end unit or bottom end plate. A top annular support element called an "adjuster flange" is supported on the support pillars and extends radially inwardly to some extent overhanging the column interior. The sliding end unit is then suspended from the adjuster flange by an array of vertical support rods, long enough for the piston to be lowered as far into the tubular housing as is likely to be necessary. Some vertical rods are fixed and function as guides, running slidably through openings in the adjuster flange. Other rods are fixed to the adjuster flange, and are connected to drive mechanisms mounted on or at the column base and operable to move the top end unit up and down. The drive may be screw operated or hydraulic, automatic or manual.

Whichever is used, there can be serious difficulties in keeping the end unit exactly level, i.e., in achieving exactly the same movement in all of the peripheral drive rods. With hydraulic drives, special systems are available for equalising the force/position in each of the circumferentially-distributed units as appropriate. However, these are expensive and complicated. Furthermore, space around a chromatography column is at a premium. The mentioned fixed pillars and drive rods already cause obstruction around the column, to the extent that it can be difficult to access the column interior for maintenance operations, e.g., removal/insertion of replacement permeable layers. It is highly undesirable to add to the obstruction and complication with further drive control mechanisms.

BRIEF SUMMARY OF THE INVENTION

In accordance with an embodiment of the invention, a chromatography column provides internal connection through the column bed space to a column end unit, particularly for use in driving the end unit axially, but additionally or alternatively for use in controlling slurry flow at the end unit. Use of the column provides various operation methods useful in packing and unpacking a column, and these also are embodiments of the invention and are described below.

In one embodiment, a chromatography column comprises a housing comprising a tubular side wall; opposed, axially spaced end units which together with the side wall define an enclosed bed space to contain a bed of particulate medium, at least one of the end units being slidable in axial direction; an axial drive element connected to the slidable end unit, the drive element extending internally in the column bed space; and a drive positioned on or beyond the opposite end unit and connected to the drive element.

A chromatography column according to an embodiment of the invention comprises a tubular housing comprising a side wall providing an interior space; a bottom end unit on which the housing is axially vertically mounted, the bottom end unit having an opening therethrough; a top end unit slidably movable in the housing, the top end unit having an upper surface, a lower surface, the top end unit further comprising a first valve comprising a first valve opening passing through the upper and lower surfaces of the top end unit, the first valve opening being axially aligned with the opening in the bottom end unit; a frame connected to the upper surface of the top end unit, the frame including an opening axially aligned with the first valve opening and the opening in the bottom end unit; an axially movable drive element comprising a rod extending through the opening in the bottom end unit, the interior space of the tubular housing, the first valve opening, and the opening in the frame, wherein the drive element further comprises a first valve recess, the first valve recess being movable through the first valve opening, wherein axial movement of the drive element moves the first valve recess in and out of the first valve opening.

In another embodiment, a chromatography column comprises a tubular housing comprising a side wall providing an interior space; a bottom end unit on which the housing is axially vertically mounted, the bottom end unit having an opening therethrough; a top end unit slidably movable in the housing, the top end unit having an upper surface, a lower surface, and a top end unit opening passing through the upper and lower surfaces, the opening being axially aligned with the bottom end unit opening; a frame connected to the upper surface of the top end unit, the frame including an opening axially aligned with the top end unit opening and the bottom end unit opening; an axially movable drive element comprising a rod extending through the bottom end unit opening, the interior space of the tubular housing, the top end unit opening, and the opening in the frame; a retainer connectable to the drive element, the retainer having a diameter that is larger than the diameter of the opening of the frame, wherein, after the retainer is connected to the drive element, axial movement of the drive element slidably moves the top end unit in the housing.

BRIEF DESCRIPTION OF THE SEVERAL VIEWS OF THE DRAWING(S)

FIG. 9 shows a flow packing process;

FIG. 10 shows flow packing driven by a hydraulic drive, or capture of the bed;

DETAILED DESCRIPTION OF THE INVENTION

Figure 1:
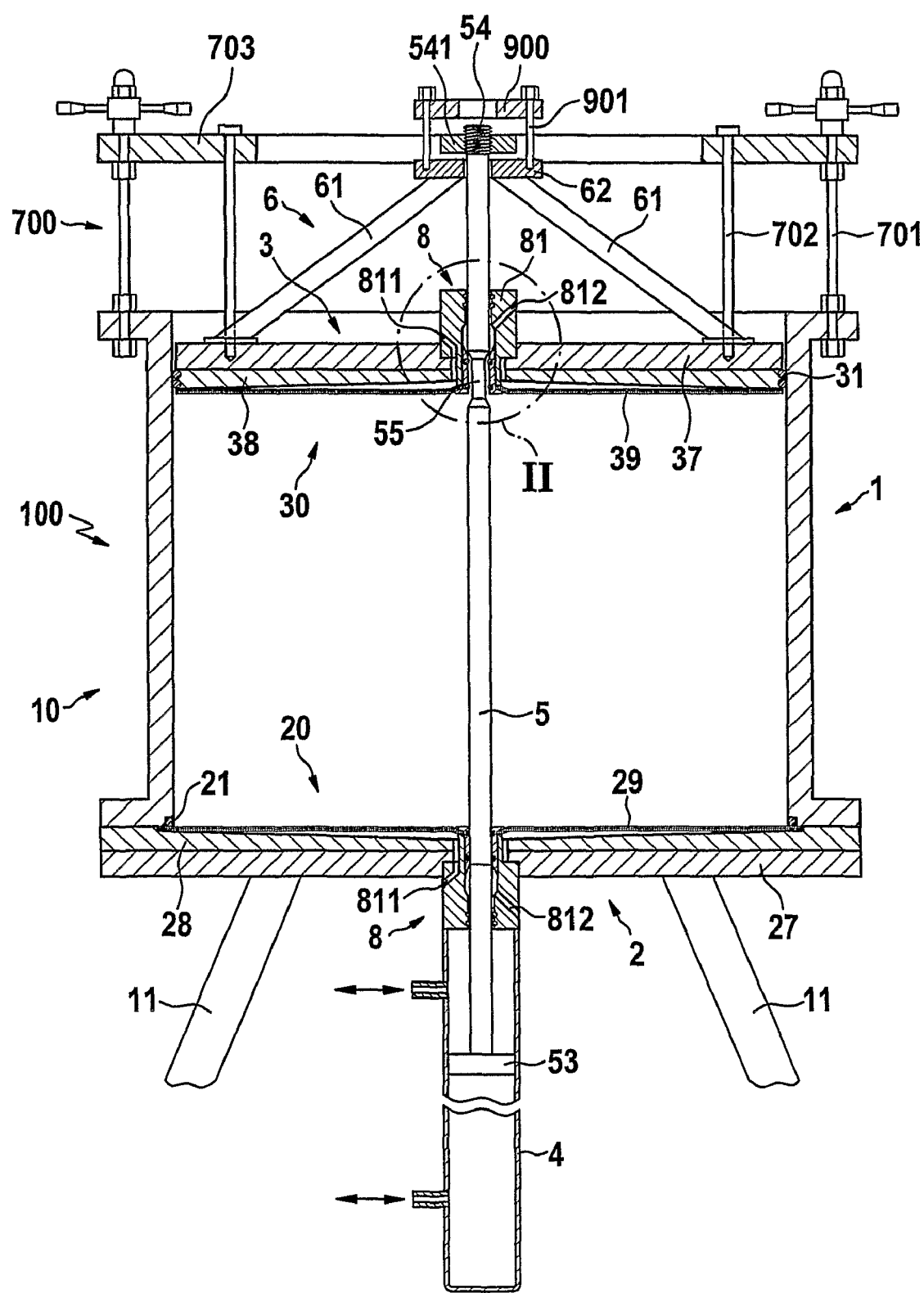
FIG. 1 is a schematic elevation of an illustrative column according to an embodiment of the invention.

In an embodiment of a chromatography column comprising a housing and having an internal bed space and opposing end units, an axial drive element, which extends internally in the column bed space, is connected to an axially slidable column end unit, and connects to a drive, on or beyond the opposite end unit. By providing axial drive connection structure internally of the bed, bulky support and drive structures outside the column housing can be reduced or eliminated.

Advantageously, it has been found that a drive element extending axially through the bed space, in contact with the bed, need not seriously affect chromatography performance.

Naturally, the internal drive element is preferably centrosymmetric. It is preferred to have a single axial drive element extending on the central axis of the column so as to act centrally on the slidable end unit. By providing a suitable connection structure for transferring axial tensile force from such a drive element to the slidable end unit, it becomes possible greatly to simplify or even to eliminate extra measures for maintaining perpendicularity of the end unit to the axis. In a preferred embodiment of the column, the drive element (e.g., a central single rod) passes through the end unit. It connects centrally outside the end unit, e.g., at a position spaced beyond the surface of an end unit thereof, to a force distribution element comprising a frame having a central connection to the tensile drive element and circumferentially-distributed connection(s) or structure to the outside of the end unit. Conveniently the force distribution element comprises a frame comprising central union for connection to the drive element and a plurality of equally-spaced limbs projecting out radially and (axially) inwardly to junctions with the end unit.

Preferably the internal drive element, e.g., a single central rod, is axially slidable through the end unit construction (including its permeable element), but can be coupled to it axially, for purposes of driving axial movement, at one or more predetermined relative axial positions of the drive element/end unit. In one embodiment this releasable engagement may enable movement of the end unit without operating the connector drive, if wished. In another embodiment it may enlarge or shift the effective axial range of the drive, by using the drive element to control only local movements of the end unit, larger movements being made uncoupled from the drive element. An axial engagement for driving may be locked in only one direction, if only one direction of drive (typically, the tensile sense for the drive element) is used. Thus, adequate locking may be achievable by compressive spacer structures. In other embodiments, relative movement of the drive element and end unit may enable the drive element to function as an operational part of a control mechanism of the end unit, and in particular of a slurry port or conduit flow control. Thus, a locking arrangement may be provided for holding a central drive element at a selected one of two or more available positions (preferably axially distinct) relative to the corresponding drivable end unit, corresponding to different respective conditions of a packing valve in which the drive element constitutes or is connected to a valve operating member.

To exploit the internal drive element structure (e.g., a single central rod), a corresponding drive at/beyond the opposite end of the column may also be a single central drive, preferably a drive operated by pressurised fluid (gas or liquid) and most preferably a hydraulic drive. For example a hydraulic ram can be attached to the underside of a lower end unit or mounting end plate of a column, the drive element(s) extending up slidably through that lower end unit or end plate. Optionally the slidable drive element may provide an operational interaction, such as operation of a valve function as mentioned above, in relation to that lower unit/plate as well as (or instead of) for the upper end unit.

In another embodiment of the invention, an access valve assembly comprises a slurry port or conduit for packing and/or unpacking slurry flow in relation to the bed space via an end unit. In a typical embodiment the end unit comprises a valve comprising a valve opening and including a valve sleeve portion, and an axial internal drive element (e.g., a rod) as discussed above constitutes a central element working in said sleeve by relative movement between them, preferably axial movement, to switch a corresponding valve conduit between various, e.g., open and closed, conditions. Thus, the valve orifice may have one or more lands which in the closed condition seal against a full-diameter portion of the rod, and in an open condition is/are brought into register with a recessed or reduced-diameter rod portion to allow flow between them. Preferably the orifice structure is fixed relative to the end unit, and movement of the drive element relative to the end unit adjusts the valve condition. However a movable orifice or sleeve could be used instead. The skilled reader will also appreciate that a localised land on the drive element could be used to provide the closed position, adjacent relative positions being open (i.e., instead of having a relative recess of the drive element). However, a recessed rod is preferred where it is desired to be able to move the rod over a significant range of movement through the end unit, because it provides a default sealed condition.

In one embodiment, a chromatography column comprises a housing comprising a tubular side wall; opposed, axially spaced end units which together with the side wall define an enclosed bed space to contain a bed of particulate medium, at least one of the end units being slidable in axial direction; an axial drive element connected to the slidable end unit, the drive element extending internally in the column bed space; and a drive positioned on or beyond the opposite end unit and connected to the drive element. In a preferred embodiment, the drive element is positioned centrosymmetrically to the housing.

In an embodiment of the column, the column has a central axis, wherein the drive element is a single drive element extending along the central axis acting centrally on the slidable end unit.

Typically, the slidable end unit of the column comprises an opening, the drive element extending through the opening.

In an embodiment, the chromatography column further comprises a force distributor on an outer surface of the slidable end unit, the drive element being connected to the force distributor. In some embodiments, the force distributor comprises a connector releasably connecting the distributor to the drive element and/or the force distributor comprises a central union connecting to the drive element and a plurality of equally spaced limbs extending radially and axially to junctions circumferentially distributed on the outer surface of the end unit.

In one embodiment, the connector comprises a locking element connecting the slidable end unit and the drive element in one or more predetermined relative axial positions. Alternatively, or additionally, in some embodiments, the connector comprises a compressive spacer element.

In one preferred embodiment, the opening of the slidable end unit comprises a slurry conduit including a packing valve.

Typically, the driving element is connected to or constitutes an operating member of the packing valve.

In a preferred embodiment, the packing valve comprises an orifice having one or more sealing lands, which in a closed condition seal against a full-diameter portion of the operating member and in an open condition is/are brought into register with a recessed or reduced-diameter portion of the operating member to allow flow between them. In some embodiments, the orifice includes an annular clearance and the operating member includes an oblique impingement surface to deflect slurry issuing from the valve into the bed space.

In accordance with some embodiments of the chromatography column according to the invention, the end units each comprise a central opening, the drive element extending through the openings. If desired, each opening can include a valve, the drive element being connected to or constituting operating members for the valves. In a preferred embodiment, each valve comprises an orifice having one or more sealing lands, which in the closed condition seal against a full-diameter portion of the operating member and in the open condition is/are brought into register with a recessed or reduced-diameter portion of the operating member to allow flow between them.

A chromatography column according to another embodiment of the invention comprises a tubular housing comprising a side wall providing an interior space; a bottom end unit on which the housing is axially vertically mounted, the bottom end unit having an opening therethrough; a top end unit slidably movable in the housing, the top end unit having an upper surface, a lower surface, the top end unit further comprising a first valve comprising a first valve opening passing through the upper and lower surfaces of the top end unit, the first valve opening being axially aligned with the opening in the bottom end unit; a frame connected to the upper surface of the top end unit, the frame including an opening axially aligned with the first valve opening and the opening in the bottom end unit; an axially movable drive element comprising a rod extending through the opening in the bottom end unit, the interior space of the tubular housing, the first valve opening, and the opening in the frame, wherein the drive element further comprises a first valve recess, the first valve recess being movable through the first valve opening, wherein axial movement of the drive element moves the first valve recess in and out of the first valve opening.

In another embodiment, a chromatography column comprises a tubular housing comprising a side wall providing an interior space; a bottom end unit on which the housing is axially vertically mounted, the bottom end unit having an opening therethrough; a top end unit slidably movable in the housing, the top end unit having an upper surface, a lower surface, and a top end unit opening passing through the upper and lower surfaces, the opening being axially aligned with the bottom end unit opening; a frame connected to the upper surface of the top end unit, the frame including an opening axially aligned with the top end unit opening and the bottom end unit opening; an axially movable drive element comprising a rod extending through the bottom end unit opening, the interior space of the tubular housing, the top end unit opening, and the opening in the frame; a retainer connectable to the drive element, the retainer having a diameter that is larger than the diameter of the opening of the frame, wherein, after the retainer is connected to the drive element, axial movement of the drive element slidably moves the top end unit in the housing.

In an embodiment, the column further comprises a retainer connectable to the drive element, the retainer having a diameter that is larger than the diameter of the opening of the frame, wherein, after the retainer is connected to the drive element, axial movement of the drive element slidably moves the top end unit in the housing.

In some embodiments, the column further comprises a second valve. For example, in one embodiment, the bottom end unit of the column further comprises a second valve, the second valve being inserted in the opening in the bottom end unit, the second valve comprising a second valve opening, and the drive element further comprises a second valve recess, the second valve recess being movable through the second valve opening, wherein axial movement of the drive element moves the second valve recess in and out of the second valve opening.

In a typical embodiment, the first valve comprises a first valve assembly including at least one port, the first valve assembly including the first valve opening. In some embodiments of the column comprising first and second valves, the second valve comprises a second valve assembly including at least one port, the valve assembly including the second valve opening. The first valve assembly and/or the second valve assembly can comprise at least two ports.

In a preferred embodiment of the column, the column further comprises a ram axially moving the drive element. In some embodiments, wherein the drive element has a first end and a second end, the first end comprises a threaded portion and/or the second end comprises a piston.

In some embodiments, the chromatography column further comprises a collar insertable between the frame and the retainer, and around a portion of the drive element.

In a embodiment, the drive element is movable to two or more axially distinct positions.

Preferably the drive element is a solid rod rather than a hollow rod, e.g., a tube. A solid rod lends strength which is desirable in the driving embodiments described above. Earlier document WO 96/10451 (Euroflow) used a hollow rod as a spray nozzle. However, it is equally viable to spray slurry into a column through a clearance between a rod and an orifice mouth. Indeed by making this an annular clearance one may achieve a more uniform distribution of slurry around the column than with a nozzle having multiple radially-directed openings. The annular recess of the rod may have an oblique impingement surface, such as a smooth conical surface, to deflect slurry issuing from the valve radially outwardly into the column bed space.

Spraying slurry in from around a central rod is in itself new, in particular with an oblique impingement surface as mentioned, and is an independent embodiment of the present invention irrespective of whether the rod is part of a drive element or the like.

In any event, a column may have such a valve at the top for spraying in slurry, or for letting air out when filling the column from below. The column may have such a valve at the bottom, for washing slurry out of the column (unpacking). Or, such valves may be provided at both the top and the bottom. In the latter case, a single central drive element may act as the operating member for both the top and the bottom valves. The drive element may be adapted (e.g., by lands or recesses) to operate only one of the two valves at a time. Or, it may have multiple valve operating features (e.g., axially-spaced recesses) enabling it, when the two end units are at an appropriate axial spacing, to operate both top and bottom valves at once, e.g., so that both can be opened when the spacing of the top and bottom end units corresponds with the spacing of the rod recesses, and the latter are brought into register with the top and bottom valve lands.

Typical embodiments relate to the valving of a single slurry port or conduit. Typically, the end unit will have a separately controlled mobile phase port or conduit communicating only to behind the permeable retaining structure, for chromatography. However, further conduits may be provided if wished, e.g., for a circulating or clean-in-place functionality and/or the ability to pack and unpack with the same valve, e.g., as proposed in WO 96/10451 (Euroflow).

One embodiment of the invention is an apparatus comprising a chromatography column having a cylindrical side wall providing an interior bed space, a fixed bottom end unit on which the column is axially vertically mounted, a top end unit slidably movable in the tubular housing, a central valve opening in the top end unit, a force distributing structure comprising a frame on top of the top plate, a central tensile drive element comprising a rod extending through the central valve opening of the top end unit and connectable for coupling axial drive to the force distribution structure thereon, a drive such as a hydraulic ram mounted beneath the bottom end unit, the tensile drive element extending down through the interior bed space of the column to the drive which is operable to move it axially, the tensile drive element having a portion or portions adapted to co-operate with complementary portional portions of the top end unit to act as a valve in a conduit communicating between the exterior of the column and the interior bed space, wherein the drive can be used to adjust the axial position of the top end unit via the drive element, and additionally the drive element is axially movable relative to the top end unit to adjust the mentioned valve between open and closed conditions.

Having a rod extending down through the bed space is a radical departure from normal practice, in which it is assumed that the bed should be as uniform as possible. However, in accordance with the invention, it has been found that the local discontinuity adjacent the rod is generally not seriously disadvantageous, being in any event much smaller in volume than the region adjacent the side wall. Furthermore, in constructions according to the invention where the central rod acts as the central valve member of a packing/unpacking valve, it is not disadvantageous when compared with conventional columns using packing/unpacking valves. In these conventional columns there is a small "dead spot" immediately opposite the central valve (because there is no permeable mesh there). Occupying this dead spot with a solid rod along the length of the column does not affect matters for the worse; indeed it may reduce the overall central perturbation in the distribution band.

In conjunction with embodiments of the apparatuses according to the invention, embodiments of the invention include a number of correspondingly new operation processes.

Firstly, and in general, embodiments of the method according to the invention encompass chromatography using any chromatography apparatus discussed above. This may involve any one or more of packing the column, running the column and unpacking the column. Embodiments of the method can also include maintenance operations, e.g., removal/insertion of permeable layers. Advantageously, permeable layers can be removed and replaced without utilizing a crane for supporting the components of the column.

In one embodiment of a method according to the invention, a process includes forming a bed of particulate medium in a column, the method including passing a slurry of the medium into the column bed space through an end unit slurry port thereof, preferably a valved port as described above, and accumulating particulate medium in the bed space. Excess carrier fluid can pass out through the permeable element, e.g., of the opposite end unit. Typically slurry is packed from the top and excess liquid escapes via the mobile phase port at the bottom. This may involve driving a central drive element to an open-valve position in relation to the end unit where the slurry is pumped in.

Additionally or alternatively, another embodiment of a method according to the invention comprises packing slurry into the column in which a central drive element forming a valve member has an annular 360° recess with a lower slurry impingement surface which spreads the incoming slurry.

Another optional embodiment of the method, after having pumped in sufficient medium to provide the intended bed height, comprises flow packing. In accordance with this embodiment, the movable end unit is at (or is adjusted to, using the drive) a position spaced above the mass of particles in the bed space, with liquid in between. Any slurry port in the top end unit is closed, e.g., by adjusting the central drive element relative to the end unit. Liquid is then pumped in through the top mobile phase conduit so that it issues into the column all over the area of the end unit, passes through the bed and leaves the opposite end similarly via the permeable element thereof. The downward flow of liquid through the particulate bed consolidates the pack.

In another embodiment of the method, a separate or additional packing stage uses the internal drive element to pull the movable end unit—typically the top end unit—onto the top of the bed of particles. Typically the mobile phase port (inlet) of the movable end unit is shut, and that of the opposing end unit open so that—at least during a phase in which the movable end unit is still spaced from the particles—flow packing occurs as liquid is driven through. In this procedure the internal drive element can keep the moving end unit or moving end unit piston truly radial, i.e., perpendicular to the axis.

When the bed has been packed, the movable end piston may be held in place either by continued energising of the drive mechanism or by a mechanical lock.

In a further embodiment, a packed column is unpacked by moving a central drive element as described relative to an end unit to adjust a slurry conduit valve in that end unit from a closed to an open position, and pumping in liquid to carry the bed medium out through the open valve as a slurry. For example the top end unit valve may be opened (by sliding the central rod) and liquid sprayed in to break up the medium which can then be sucked out and/or urged out, at the piston end, by gradually lowering the top end unit piston using the drive element.

Another optional embodiment, which can be combined with the above, is a drainage operation in which the central drive element (e.g., a rod) has two axially-spaced recesses, e.g., annular recesses, comprising lowering the top end unit progressively closer to the bottom end unit until the spacing between the end units or end plates matches the recess spacing, and the recesses are registered with the end units or plates so that both of their valves are open. Liquid can then be pumped in freely through the top opening and remaining slurry escapes through the open bottom valve.

Each of the components of the invention will now be described in more detail below, wherein like components have like reference numbers.

Figure 1A:
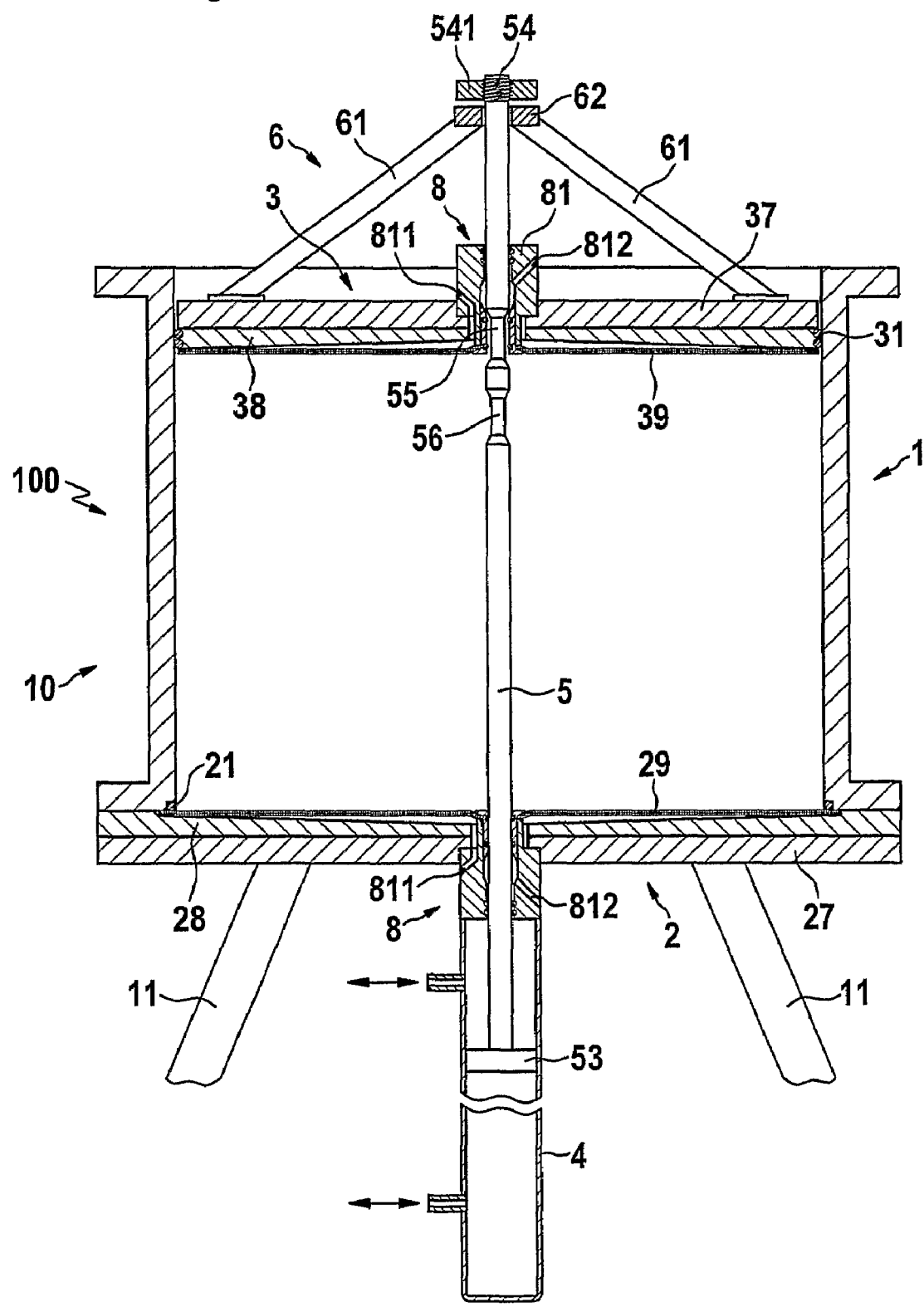
FIG. 1a is a schematic elevation of an illustrative column according to another embodiment of the invention.

With reference to the embodiments of the invention illustrated in FIG. 1 and FIG. 1a, a large industrial chromatography column 100 comprising a housing 10 has a tubular steel column side wall 1, a fixed bottom end unit 2 and a slidable top end unit 3. FIG. 1 also illustrates an adjusting frame 700 comprising an adjuster flange 700 and vertical support rods (shown as guide rods 702 and tie-rods 701) positioned over the slidable top end 3 and the column housing, e.g., for locking the top end unit 3 in position. FIG. 1 also illustrates an additional flange or plate 900, and supports 901 (shown as bolts), e.g., for allowing upward movement of the top end unit when desired, for example, during preparation for column packing. As will be explained in more detail below, FIG. 1 also shows a retainer 541 and a fixing plate 62. For ease of illustration, FIG. 1 shows space between the lower surface of additional flange 900 and the top surface of retainer 541, and space between the bottom surface of retainer 541 and the top surface of fixing plate 62. However, when additional flange 900 is utilized, it is secured, e.g., by tightening the supports 901, such that the retainer 541 is secured between flange 900 and fixing plate 62. While not shown in the other Figures, an adjusting frame and/or an additional flange or plate can be utilized with any embodiment of the invention.

In accordance with the embodiments illustrated in FIGS. 1 and 1a, the top end unit 3 has outwardly directed annular seals 31 engaging the column wall interior as is known in the art. The bottom end unit is also sealed by fixed annular seals 21 to the column wall above. In this illustrated embodiment, the bottom end unit 2 stands on a wheeled support 11 as is also known in the art. The components are of steel but other materials are possible, e.g., a transparent synthetic column tube. A hydraulic drive 4 such as a ram is fixed centrally beneath the bottom end unit 2. The drive element 5 (e.g., a rod) thereof passes up through a central opening of the bottom end unit 2, extends up the central axis of the column tube and through an opposed central opening in the top end unit 3. The motive fluid for the drive may be selected for compatibility with column interior conditions, if it may contact the drive element. Suitable motive fluids include, but are not limited to, water, especially purified/sterilised water (e.g. "water for injection"), or glycerol, or a glycerol/water mix. Or, for example, a pneumatic drive may be used.

A force distribution element comprising a frame 6 is fixed to the top of the top end unit 3, preferably having three or four equi-spaced legs 61 whose outer ends are bolted near the edge of the top end unit and which meet centrally at a fixing plate 62 with a central hole through which the drive element 5 can pass.

Figure 2:
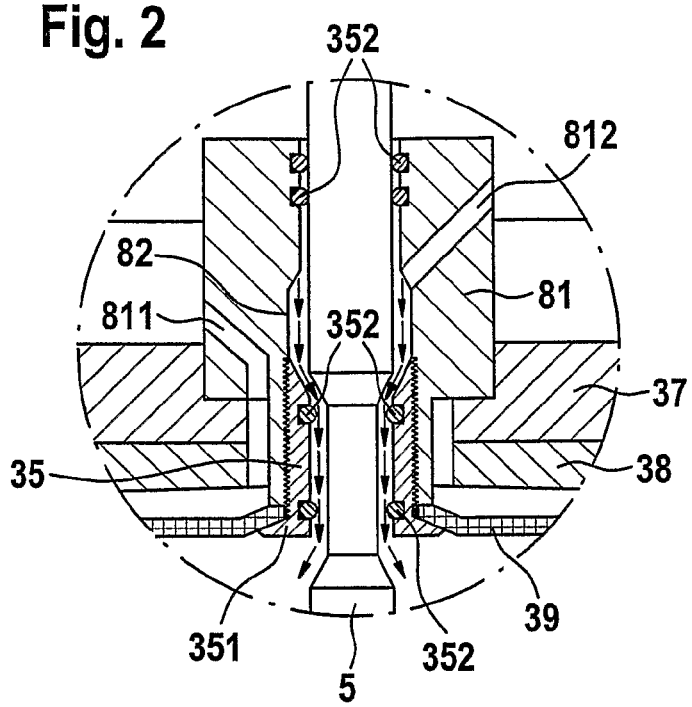
FIG. 2 is a part-detail of a top valve of the column.

The bottom end of the drive element 5 carries a piston 53 operable in the hydraulic drive 4. The top end of the drive element 5 has a securing thread 54 at its tip and, spaced below this, a first annular recess 55 and (optionally) a second similarly-shaped annular recess 56 (shown in FIG. 1a). In this illustrated embodiment, the or each recess 55,56 has a central cylindrical waist 59 and upper and lower conical portions 58 (see FIG. 8). As will be described in more detail below, and as shown in FIG. 2, when a recess is aligned with a valve opening (e.g., wherein the valve comprises an annulus 55 and one or more seals or sealing lands 352), a clearance is provided and the valve is in the open position.

Typically the column will be from 200 mm to 2000 mm in diameter. The one illustrated represents a 400 mm column for example's sake. The central drive element 5 is preferably a solid steel rod of high tensile steel capable of taking the outward load on the top end unit 3 when the column is full of pressurised fluid. In a 400 mm column that force might be 3 or 4 metric tonnes, or even more, at its greatest.

Each of the top and bottom end units 2,3, comprises a plate assembly 20,30, comprising a solid steel outer plate 27,37, an inner machined plate 28,38 providing a slightly concave flow control surface milled with a large number of fluid flow guidance channels (not shown), and a permeable element 29,39, preferably a planar mesh (or sinter) disc, clamped by edge seals across the entire inner face of the plate assembly. The back of the permeable element rests rearwardly against the edges of support fins on the profiled channel plate 28,38. The centre of the element has a hole registered with central holes through the other two end units, and in these holes a valve comprising a slurry valve assembly 8 is mounted. The illustrated slurry valve assembly has a valve block 81 recessed into the back of the end unit, and defines a tubular axial orifice, with a front tubular extension supporting and holding the centre of the permeable element 39. The valve block has a centrally enlarged opening 82 for the passage of slurry. At the front mouth of the tubular valve sleeve, the illustrated valve has a solid sleeve or annulus 35 (see also FIG. 2) having a front ring flange 351 which clamps the circular inner edge of the permeable element 39, and screws into the metal tubular valve structure. The valve communicates back through the end unit to external connection ports. One port, marked 811 in FIG. 1 (hereinafter, port 811 is referred to as the "MP port" or the "mobile phase port"), is for mobile phase liquid and communicates into the flow channel space between the permeable element and the profiled inner plate. Liquid pumped in through this port flows onto the entire area of the bed surface through the permeable element 39, usually for chromatography (but see below). Another port, marked 812 in FIG. 1 (hereinafter, port 812 is referred to as the "slurry port"), communicates directly with the annular valve sleeve which, when it is open, communicates directly into the column interior, i.e., not via the permeable element 39. See WO 96/10451, describing a three-port construction in which the port there called the "waste port" can here be the "slurry port."

The central drive element 5 acts as a movable operating member for this central valve. Because the drive element 5 must move into and out of the column space, it does not (unlike the injector nozzle in WO 96/10451) carry sealing rings. Instead, one or more seals or sealing lands 352 such as sealing rings are mounted on the inward surface of the annulus 35. When the recess 55 of the drive element 5 registers with one or more seals 352, there is clearance and the valve is open enabling slurry to pass in or out. When the full diameter of drive element 5 opposes the seal annulus 35, it seals against the seal(s) and the port is fully closed. The annulus, which screws into the metal valve block 81, is preferably of engineering plastics such as PEEK to avoid fouling the metal rod 5.

Figure 3:
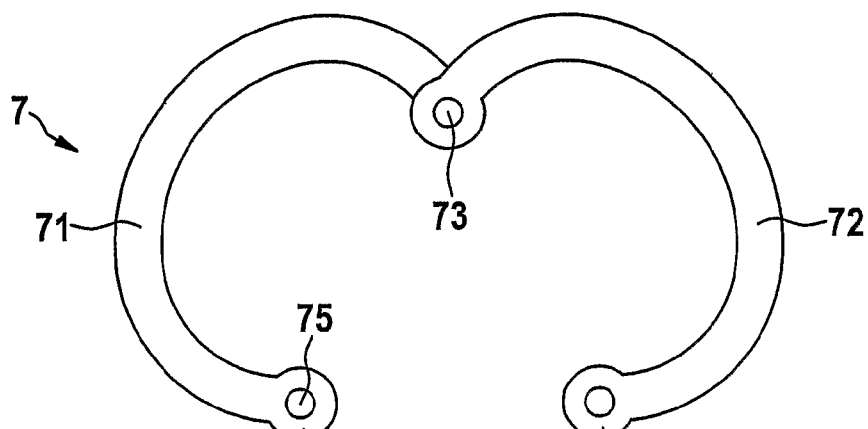
FIGS. 3, 4, 5 are respectively a top view, joint detail view and schematic sectional view in situ of a spacer collar used for connecting a drive element to the top end unit.
Figure 4:
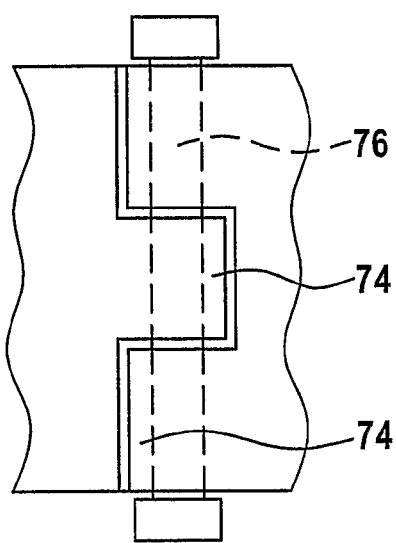
Figure 5:
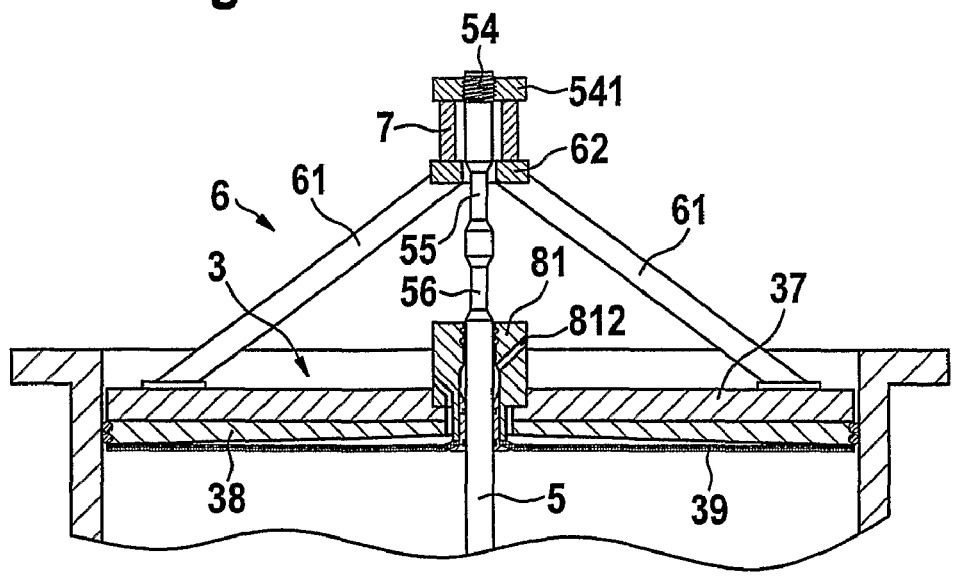

FIGS. 3 to 5 show some further details of an exemplary force distribution structure comprising a frame on top of the top end unit 3. See also FIGS. 1 and 1a. The illustrated force distribution frame 6 has a top fixing or frame plate 62 with a central hole through which the drive element 5 can pass. A retainer 541 such as nut screwed onto the end thread 54 of the rod prevents the rod from being pulled down through this hole, and provides a first axially coupled position of the structure, in which the valve recess 55 (and further recess 56 shown in FIG. 1a) are both beneath the frame, the recess 55 registering in the valve-open position shown in FIG. 2. Axial pull from the hydraulic drive 4 will exert a corresponding evenly distributed downward force on the top end unit 3. When an additional flange or plate 900 is mounted to the fixing plate 62 (with the retainer 541 tightly interposed between the flange 900 and the fixing plate 62) as shown in FIG. 1 is utilized, axial push from the hydraulic drive 4 will move the top end unit upwardly, i.e., away from the bottom end unit 2.

For example, when preparing the column for packing, e.g., to place the top end unit 3 in the desired initial position above the desired packed bed height, and with additional plate 900 mounted as described above (and as generally shown in FIG. 1), the drive 4 is operated to drive the drive element 5 upwardly which also moves the top end unit 3 upwardly to the initial position. Additional plate 900 is subsequently removed, e.g., before using the spacer collar, and before lowering the drive element 5 during priming, as described below.

With reference to FIGS. 3 to 5, a removable spacer collar 7 is provided which can be introduced between the fixing plate 62 and the top retainer 541 (FIG. 5) to provide a different axially coupled position in which the recesses 55,56 are brought above the top end unit central opening so that its valve is closed and only the plain cylindrical drive element extends down into the bed space. In this illustrated embodiment the spacer collar 7 is formed as a pivoted yoke having opposed semicircular limbs 71,72 connected by a pivot 73, at which the yoke is joined to the top fixing plate 62 so that it does not fall off. By driving the drive element 5 up through the column with the top end unit stationary, its top part projects above the fixing plate 62 so that the spacer limbs 71,72 can be swung together beneath the nut and locked in place by a locking pin 76 (FIG. 4) passing through aligned locking opening 75 in interlock parts 74 of the limb tips. In this position the drive can apply tensile pull to the upper end with its valve construction in the closed condition.

Figure 6:
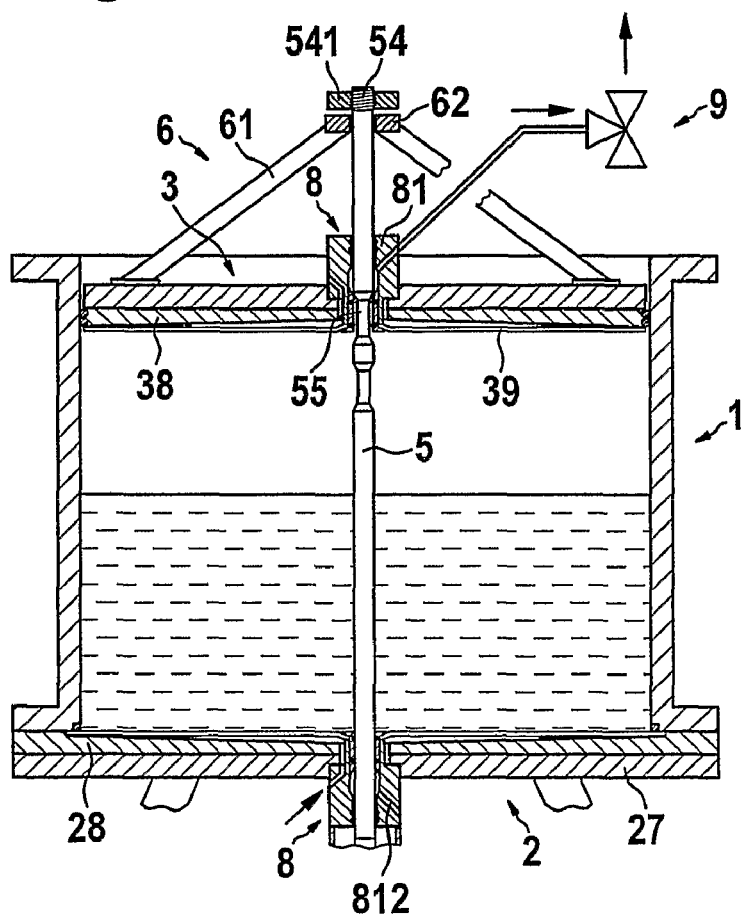
FIG. 6 shows priming of the column in use.
Figure 7:
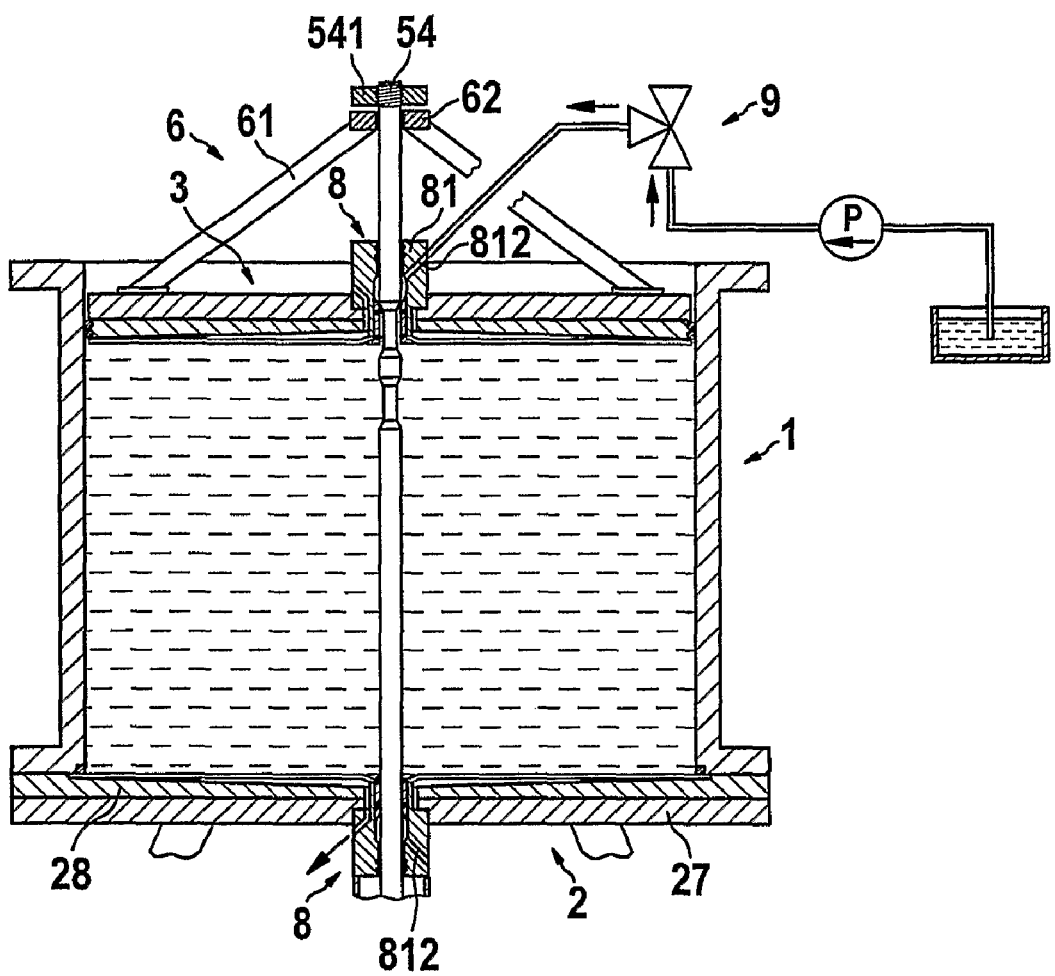
FIG. 7 shows packing the column with slurry.

FIG. 6 shows a priming stage in which the drive element 5 is lowered to open the top valve, allowing a liquid such as water or 20% ethanol to be pumped in through the lower mobile phase port or conduit and air to escape through the top slurry port or conduit. (It may also escape through the top mobile phase port or conduit). Once all the air has been excluded, a valve 9 (e.g., a 3-way valve) is switched to pump slurry from a slurry supply, in through the top slurry conduit and down into the column space as shown in FIG. 7. The excess liquid flows away through the bottom mobile phase port or conduit. The bottom permeable element 29 retains the particulate medium which accumulates as a packed bed.

Figure 8:
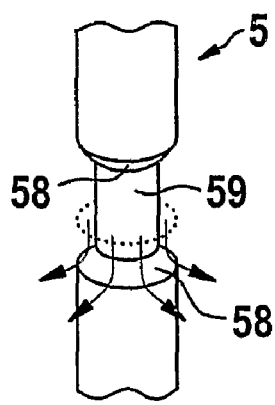
FIG. 8 shows schematically a detail of a valve operation clearance on the drive element and its effect on slurry during packing.

FIG. 8 illustrates an advantage of the solid rod construction having the conical solid surfaces 58 at the rod recesses. The injected slurry meets these conical surfaces and spreads out uniformly in a 360° pattern, by contrast with the nozzle jets in WO 96/10451 and similar designs which may introduce a slight non-uniformity of slurry injection.

Once sufficient medium has been pumped in to form a bed, it may be flow packed. This entails driving liquid through the bed to force it into a more closely packed condition. This is shown in FIG. 9. The hydraulic drive 4 is operated to drive the tensile drive element 5 up through the top end unit to its highest position relative to the top end unit, closing the central valve thereof. The spacer collar 7 is engaged beneath the retainer nut 541 to lock this position. Liquid can then be pumped in through the top end unit mobile phase port (shown here as an inlet port) 811 through the top mesh and down through the bed as shown.

FIG. 10 shows an alternative or further stage: by using the drive 4 to pull the top end unit down, now in top valve-closed condition (i.e., wherein the top end unit MP and slurry ports are closed) liquid in the column is forced through the bed to flow pack it, driving the excess liquid out through the bottom end unit mobile phase port (shown here as an outlet port) 811. The hydraulic drive 4 can receive pressurised fluid above the piston 53, for this purpose. When the top end unit 3 meets the top of the bed, the bed is captured and ready for use.

At the end of this stage the hydraulic drive 4 can be left energised, e.g., by use of an accumulator bottle, giving a constant applied force on the bed, or the top end unit can be locked in position by mechanical means, e.g., via support rods such as tie-bars, and an adjuster flange positioned above the column housing (e.g., adjuster flange 703 as shown in FIG. 1).

Figure 11:
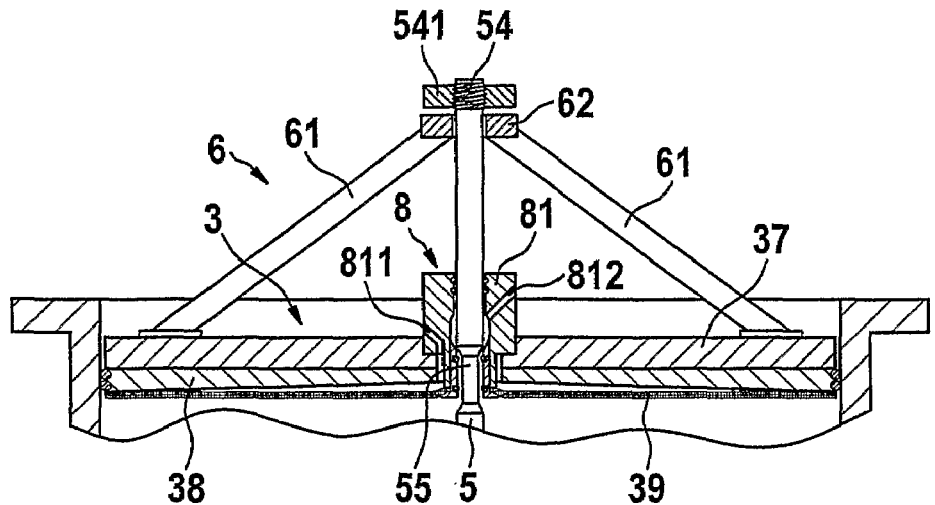
FIG. 11 shows adjustment of the top end unit to an unpacking position.

To unpack the bed the drive element 5 is raised sufficiently to remove the spacer collar 7. The drive element 5 is then pulled down through the mounting plate 62 until its upper recess 55 provides a valve-open condition of the top end unit (FIG. 11). Note that the lower recess 56 has passed right through and is spaced below, inside the bed space.

Figure 12:
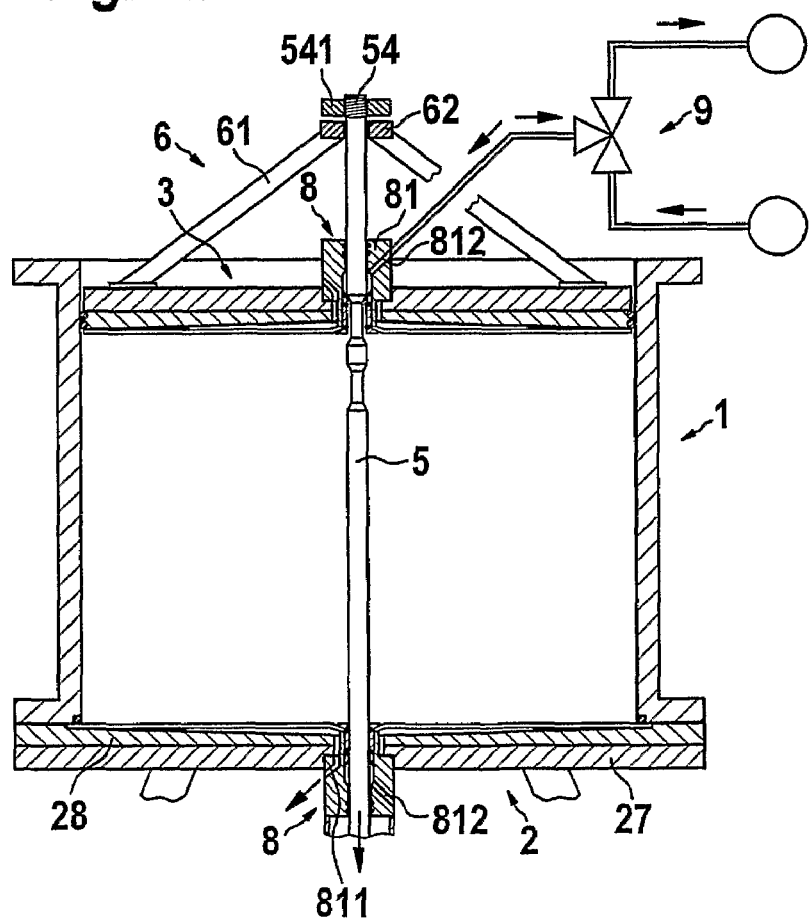
FIG. 12 shows unpacking in progress.

In this position (and as shown in FIG. 12), medium can be broken up and pumped away by spraying in unpacking liquid, removing slurried medium by gradual pulling down of the end plate piston 3 via drive element 5 combined with some suction at the slurry port. For example, FIG. 12 shows valve 9 can be operated to allow unpacking liquid to be sprayed in, and slurried medium to be withdrawn through, top end unit slurry port 812. Additional liquid for disruption and slurrying can be pumped in through the top and/or bottom permeable elements (e.g., through the mobile phase ports 811).

Figure 13:
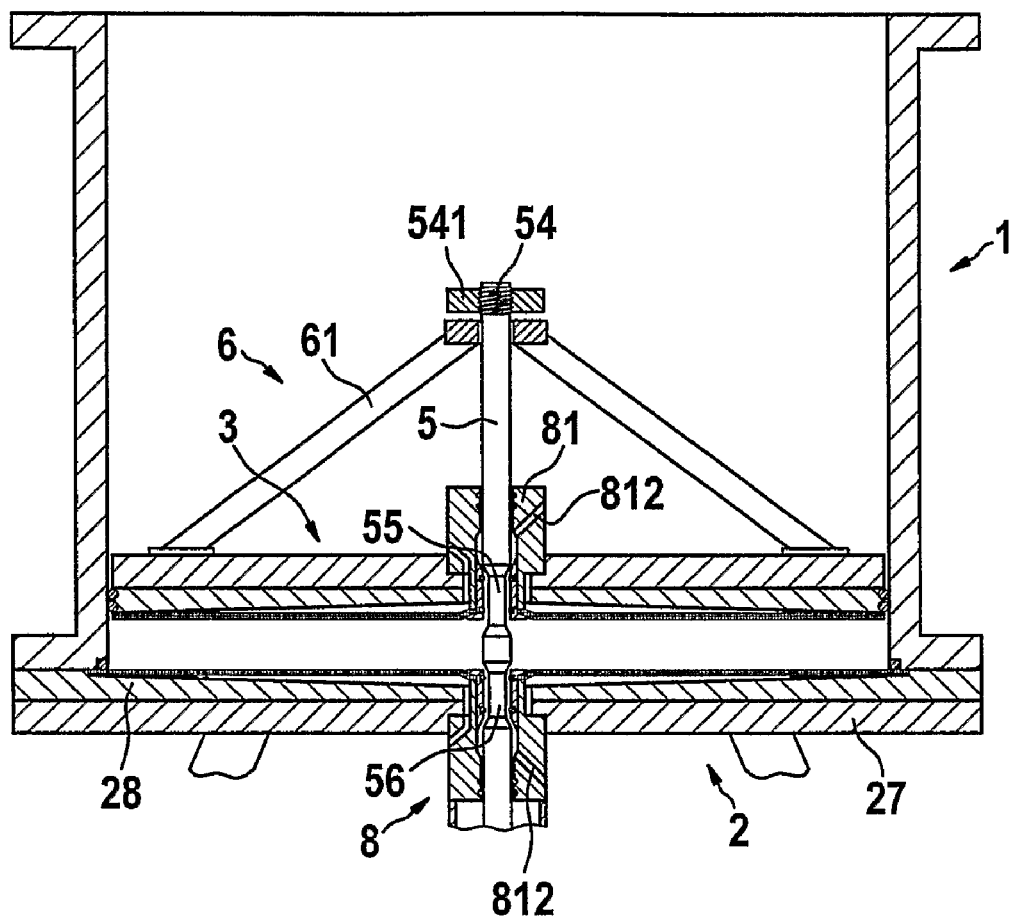
FIG. 13 shows a final drainage stage.

FIG. 13 shows a final stage in which the top end unit 3 has been pulled down so far that the lower recess 56 of the drive element 5 comes into register with the valve seals of the bottom end 2 and opens the slurry valve there. In this condition both top and bottom slurry valves are open and all remaining slurry can easily be washed and drained from the column interior.

When the column is not in use it is possible to remove the retainer 541 so that the top end unit can be lifted off, allowing for normal maintenance access (e.g., to replace the permeable elements 29,39) and so forth. In some embodiments, after retainer 541 is removed, the flange 900 can be remounted to fixing plate 62, e.g., so that flange 900 can be gripped/mounted to allow the top end unit to be more easily lifted up. For example, after the flange 900 is gripped and the top end unit is pulled upwardly to a desired height, a desired number of tie-rods 701 can be fastened (e.g., with retainers) to hold the end unit in position, a desired number of guide rods can be removed, if desired, the flange 900 can also be removed, and the permeable elements can be accessed and replaced.

The invention claimed is:

1. A chromatography column comprising:
   a housing comprising a tubular side wall;
   opposed, axially spaced end units which together with the side wall define an enclosed bed space to contain a bed of particulate medium, at least one of the end units being slidable in an axial direction and including an opening;
   an axial drive element extending through the opening, movable through the opening with respect to the slidable end unit and connected to the slidable end unit, said drive element extending internally in the column bed space; and,
   a drive positioned on or beyond the opposite end unit and connected to the drive element.

2. The chromatography column of claim 1, wherein the drive element is positioned centrosymmetrically to the housing.

3. The chromatography column of claim 2, having a central axis, wherein the drive element is a single drive element extending along the central axis acting centrally on the slidable end unit.

4. The chromatography column of claim 1, further comprising a force distributor on an outer surface of the slidable end unit, said drive element being connected to said force distributor.

5. The chromatography column of claim 4, wherein the force distributor comprises a connector releasably connecting the distributor to the drive element.

6. The chromatography column of claim 5, wherein the connector comprises a locking element connecting the slidable end unit and the drive element in one or more predetermined relative axial positions.

7. The chromatography column of claim 5, wherein the connector comprises a compressive spacer element.

8. The chromatography column of claim 4, wherein the force distributor comprises a central union connecting to the drive element and a plurality of equally spaced limbs extending radially and axially to junctions circumferentially distributed on the outer surface of the end unit.

9. The chromatography column of claim 1, wherein the opening of the slidable end unit comprises a slurry conduit including a packing valve.

10. The chromatography column of claim 9, wherein the driving element is connected to or constitutes an operating member of the packing valve.

11. The chromatography column of claim 10, wherein the valve comprises an orifice having one or more sealing lands, which in a closed condition seal against a full-diameter portion of the operating member and in an open condition is/are brought into register with a recessed or reduced-diameter portion of the operating member to allow flow between them.

12. The chromatography column of claim 11, wherein the orifice includes an annular clearance and the operating member includes an oblique impingement surface to deflect slurry issuing from the valve into the bed space.

13. The chromatography column of claim 1, wherein the end units each comprise a central opening, said drive element extending through the openings.

14. The chromatography column of claim 13, wherein each opening includes a valve, said drive element being connected to or constituting operating members for the valves.

15. The chromatography column of claim 14, wherein each valve comprises an orifice having one or more sealing lands, which in the closed condition seal against a full-diameter portion of the operating member and in the open condition is/are brought into register with a recessed or reduced-diameter portion of the operating member to allow flow between them.

16. A chromatography column comprising:
   a tubular housing comprising a side wall providing an interior space;
   a bottom end unit on which the housing is axially vertically mounted, the bottom end unit having an opening therethrough;
   a top end unit slidably movable in the housing, the top end unit having an upper surface, a lower surface, the top end unit further comprising a first valve comprising a first valve opening passing through the upper and lower surfaces of the top end unit, the first valve opening being axially aligned with the opening in the bottom end unit;
   a frame connected to the upper surface of the top end unit, the frame including an opening axially aligned with the first valve opening and the opening in the bottom end unit;
   an axially movable drive element comprising a rod extending through the opening in the bottom end unit, the interior space of the tubular housing, the first valve opening, and the opening in the frame, wherein the drive element further comprises a first valve recess, the first valve recess being movable through the first valve opening, wherein axial movement of the drive element moves the first valve recess in and out of the first valve opening.

17. The chromatography column of claim 16, further comprising a retainer connectable to the drive element, the retainer having a diameter that is larger than the diameter of the opening of the frame, wherein, after the retainer is connected to the drive element, axial movement of the drive element slidably moves the top end unit in the housing.

18. The chromatography column of claim 16, wherein the bottom end unit further comprises a second valve, the second valve being inserted in the opening in the bottom end unit, the second valve comprising a second valve opening, and the drive element further comprises a second valve recess, the second valve recess being movable through the second valve opening, wherein axial movement of the drive element moves the second valve recess in and out of the second valve opening.

19. The chromatography column of claim 16, wherein the first valve comprises a first valve assembly including at least one port, the first valve assembly including the first valve opening.

20. The chromatography column of claim 19, wherein the first valve assembly and/or the second valve assembly comprises at least two ports.

21. The chromatography column of claim 16, wherein the second valve comprises a second valve assembly including at least one port, the valve assembly including the second valve opening.

22. The chromatography column of claim 16, further comprising a ram axially moving the drive element.

23. The chromatography column of claim 16, further comprising a collar insertable between the frame and the retainer, and around a portion of the drive element.

24. A chromatography column comprising:
- a tubular housing comprising a side wall providing an interior space;
- a bottom end unit on which the housing is axially vertically mounted, the bottom end unit having an opening therethrough;
- a top end unit slidably movable in the housing, the top end unit having an upper surface, a lower surface, and a top end unit opening passing through the upper and lower surfaces, the opening being axially aligned with the bottom end unit opening;
- a frame connected to the upper surface of the top end unit, the frame including an opening axially aligned with the top end unit opening and the bottom end unit opening;
- an axially movable drive element comprising a rod extending through and movable with respect to each of the bottom end unit opening, the interior space of the tubular housing, the top end unit opening, and the opening in the frame;
- a retainer connectable to the drive element, the retainer having a diameter that is larger than the diameter of the opening of the frame, wherein, after the retainer is connected to the drive element, axial movement of the drive element slidably moves the top end unit in the housing.

* * * * *